US008612087B2

(12) United States Patent
Girotto

(10) Patent No.: US 8,612,087 B2
(45) Date of Patent: Dec. 17, 2013

(54) METHOD FOR THE DETECTION OF A COMPONENT MALFUNCTION ALONG THE LIFE OF AN INTERNAL COMBUSTION ENGINE

(75) Inventor: Marco Girotto, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 13/102,770

(22) Filed: May 6, 2011

(65) Prior Publication Data

US 2011/0288719 A1 Nov. 24, 2011

(30) Foreign Application Priority Data

May 21, 2010 (GB) .................................. 1008499.4

(51) Int. Cl.

*G01M 15/11* (2006.01)
*B60W 10/06* (2006.01)
*G05B 23/02* (2006.01)

(52) U.S. Cl.

USPC .................... 701/29.1; 73/114.04; 180/65.28; 702/183

(58) Field of Classification Search

USPC ........ 701/29; 73/114.04; 180/65.28; 702/183
See application file for complete search history.

(56) References Cited

U.S. PATENT DOCUMENTS

| | | | | |
|---|---|---|---|---|
| 5,485,374 | A | 1/1996 | Takaku et al. | |
| 5,869,752 | A * | 2/1999 | Klauber et al. | 73/114.15 |
| 6,131,444 | A | 10/2000 | Wu et al. | |
| 6,243,641 | B1 | 6/2001 | Andrews et al. | |
| 6,273,075 | B1 * | 8/2001 | Choi et al. | 123/673 |
| 6,978,666 | B1 * | 12/2005 | Wu et al. | 73/114.04 |
| 7,032,439 | B2 * | 4/2006 | Lee et al. | 73/114.04 |
| 7,665,558 | B2 * | 2/2010 | Akimoto et al. | 180/65.28 |
| 7,991,585 | B2 * | 8/2011 | Tracey | 702/183 |
| 2003/0196481 | A1 | 10/2003 | Okamura et al. | |
| 2009/0229354 | A1 * | 9/2009 | Galtier et al. | 73/114.02 |
| 2009/0312941 | A1 * | 12/2009 | Wang et al. | 701/114 |

OTHER PUBLICATIONS

British Patent Office, British Search Report for British Application No. 1008499.4, dated Aug. 2, 2010.

* cited by examiner

*Primary Examiner* — Fadey Jabr
*Assistant Examiner* — Yazan A Soofi
(74) *Attorney, Agent, or Firm* — Ingrassia Fisher & Lorenz, P.C.

(57) ABSTRACT

A method is provided for the detection of a component malfunction along the life of an Internal Combustion Engine. The engine, having at least a cylinder and being controlled by an Electronic Control Unit (ECU), the method includes, but is not limited to defining a pre-determined component malfunction classifier at the start of engine life and setting the classifier as active classifier, defining a validity condition for said active classifier, acquiring in real time a set of relevant signals relating to the operation of the component, feeding the signals to said active classifier in order to determine the occurrence or not of a malfunction of the component, and in case the validity condition of said actual classifier is not satisfied, defining a new classifier using the most recent relevant signals recorded by the ECU, and substituting the actual classifier with the new classifier.

10 Claims, 5 Drawing Sheets

METHOD FOR THE DETECTION OF A COMPONENT MALFUNCTION ALONG THE LIFE OF AN INTERNAL COMBUSTION ENGINE

CROSS-REFERENCE TO RELATED APPLICATION

This application claims priority to British Patent Application No. 1008499.4, filed May 21, 2010, which is incorporated herein by reference in its entirety.

TECHNICAL FIELD

The technical field relates to a method for the detection of a component malfunction along the life of an Internal Combustion Engine (ICE).

BACKGROUND

Components malfunction in internal combustion engines give rise to numerous problems and it is desirable to have a reliable method for detecting them. For example, an incorrect combustion within one or more cylinders in an internal combustion engine with controlled ignition is generally indicated as misfire. Misfire events have very negative effects on engine performance, on emissions values and could also cause damages on the catalyst. European and OBDII legislation require detecting misfire events causing excess emissions.

Most current cylinder misfire detection methods use the angular acceleration of the drive shaft in order to find a misfiring cylinder. As already well known these methods are not perfectly suitable since the angular acceleration of the drive shaft is influenced not only by misfire but also, for example, by the roughness of the road and by very sudden decelerations. Other detection methods use other signals or detailed mathematical models in order to estimate the misfire condition.

The most widespread method for detecting misfire treat this argument as a component monitoring, comparing the value of a signal built from directly measured signals (for example the phonic wheel angular position) with some thresholds: if these thresholds are exceeded then a misfire is detected. This approach may lead to false detections and, in general, to an unsuitable way to monitor the combustion since an issue on the combustion could be the effect of different phenomena. So a more suitable logic is needed in order to identify, during the engine life, the misfire events avoiding false detections. Moreover, known pattern recognition models are only static models that do not take into account, during the engine life, the variations of the engine system having effect on the misfire detection.

At least a first object is to provide a method of detecting components malfunction or other undesirable events that takes into account possible variations of the components behavior during engine life and the associate components drift. At least a further object is to provide a malfunctioning detection method suitable for detecting misfire events and that takes into account possible variations during engine life of the phenomena associated and of the possible components drift. At least another object is to provide a malfunction detection method for components of an internal combustion engine that does not use complex devices and that takes advantage from the computational capabilities of the Electronic Control Unit (ECU) of the vehicle. In addition, other objects, desirable features and characteristics will become apparent from the subsequent summary and detailed description, and the appended claims, taken in conjunction with the accompanying drawings and this background.

SUMMARY

An embodiment provides for a method for the detection of a component malfunction along the life of an Internal Combustion Engine, said engine, having at least a cylinder and being controlled by an Electronic Control Unit (ECU), the method comprising defining a pre-determined component malfunction classifier at the start of engine life and setting said classifier as active classifier, defining a validity condition for said active classifier, acquiring in real time a set of relevant signals relating to the operation of said component, feeding said signals to said active classifier in order to determine the occurrence or not of a malfunction of said component, and in case the validity condition of said actual classifier is not satisfied, defining a new classifier using the most recent relevant signals recorded by said ECU, and substituting the actual classifier with said new classifier. One of the advantages of the above method is that it allows to detect a malfunctioning of a component along the life of the engine, taking into account variations of behavior of the component due to drift of the same over time or due to any other cause.

According to an embodiment, said pre-determined classifier is defined by means of a training session in order to train said classifier to distinguish the occurrence or not of a malfunction of said component, said training session comprising the input into said classifier of a plurality of signals subdivided in signals pertaining to a malfunction of said component and signals pertaining to a regular functioning of said component. This embodiment advantageously allows defining, at the start of engine life, two subsets for an associated classifier where one subset is able to classify normal behavior of the component and the other subset is able to classify a malfunctioning of the component.

In a further embodiment the validity condition of said active classifier is evaluated as a function of the mean and of the variance values of the input signals pertaining to said component. This embodiment advantageously allows defining a validity condition for the active classifier.

In a further embodiment said validity condition is satisfied if the absolute value of the difference between the original mean of the signals pertaining to a regular functioning of said component and the mean of the signals calculated using the most recent relevant signals is lower than a minimum threshold or higher than a maximum threshold. This embodiment allows detecting when the validity condition for the active classifier is satisfied, using data pertaining to the functioning of said component.

In a still further embodiment said validity condition is satisfied if the absolute value of the difference between the original variance of the signals pertaining to a regular functioning of said component and the variance of the signals calculated using the most recent relevant signals is lower than a minimum threshold or higher than a maximum threshold. This embodiment allows a robust detection of the validity condition for the active classifier.

In a still further embodiment, a search for a new classifier is performed continuously during the life of said engine. This embodiment allows precalculating a new classifier that can readily be substituted to the active classifier is the validity condition for the active classifier is not anymore satisfied.

According to an embodiment said component is a cylinder of said engine and said malfunction is a misfire.

The method according to one of its aspects can be carried out with the help of a computer program comprising a program-code for carrying out all the steps of the method described above, and in the form of computer program product comprising the computer program. The computer program product can be embodied as a control apparatus for an internal combustion engine, comprising an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

The method according to a further embodiment can be also embodied as an electromagnetic signal, said signal being modulated to carry a sequence of data bits which represents a computer program to carry out all steps of the method.

A still further aspect of the disclosure provides an internal combustion engine having at least a cylinder and comprising an Electronic Control Unit (ECU) specially arranged for carrying out the method claimed.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Pattern recognition and more in general classification problems are solved, in literature, by different methods. Generically pattern recognition/classification methods (from well-known literature) work in the following way. First they extract from a training set of time-variant signals a set of information/parameters of different kinds related to the pattern recognition method chosen. This information is used to define the classifier. Secondly in real time, the pattern recognition method, using the classifier built in the first step, evaluates the samples in input in order to classify them.

Therefore, starting from a training set of multidimensional samples, classification procedures permits to: (i) reduce the dimensions of the multi-dimensional space of the inputted samples, projecting them into directions that have the largest variance; (ii) create a classification rule where a pre-determined number of classes (or groups) is defined. The classes are determined minimizing the within-classes variance and maximizing the between-classes variance. The within-classes variance is the variance of the samples of the same class, while the between-classes variance is the variance between samples of different classes. The result looks like a projection matrix (in order to perform a real-time projection of the input samples into the new less-dimensional space) that has the property to separate in an optimal way the samples used as training set; and (iii) classify the inputted samples by means of the classification rule: in this way each sample is assigned to the most appropriate class, taking into account the classification rule provided by point (ii).

Figure 1:
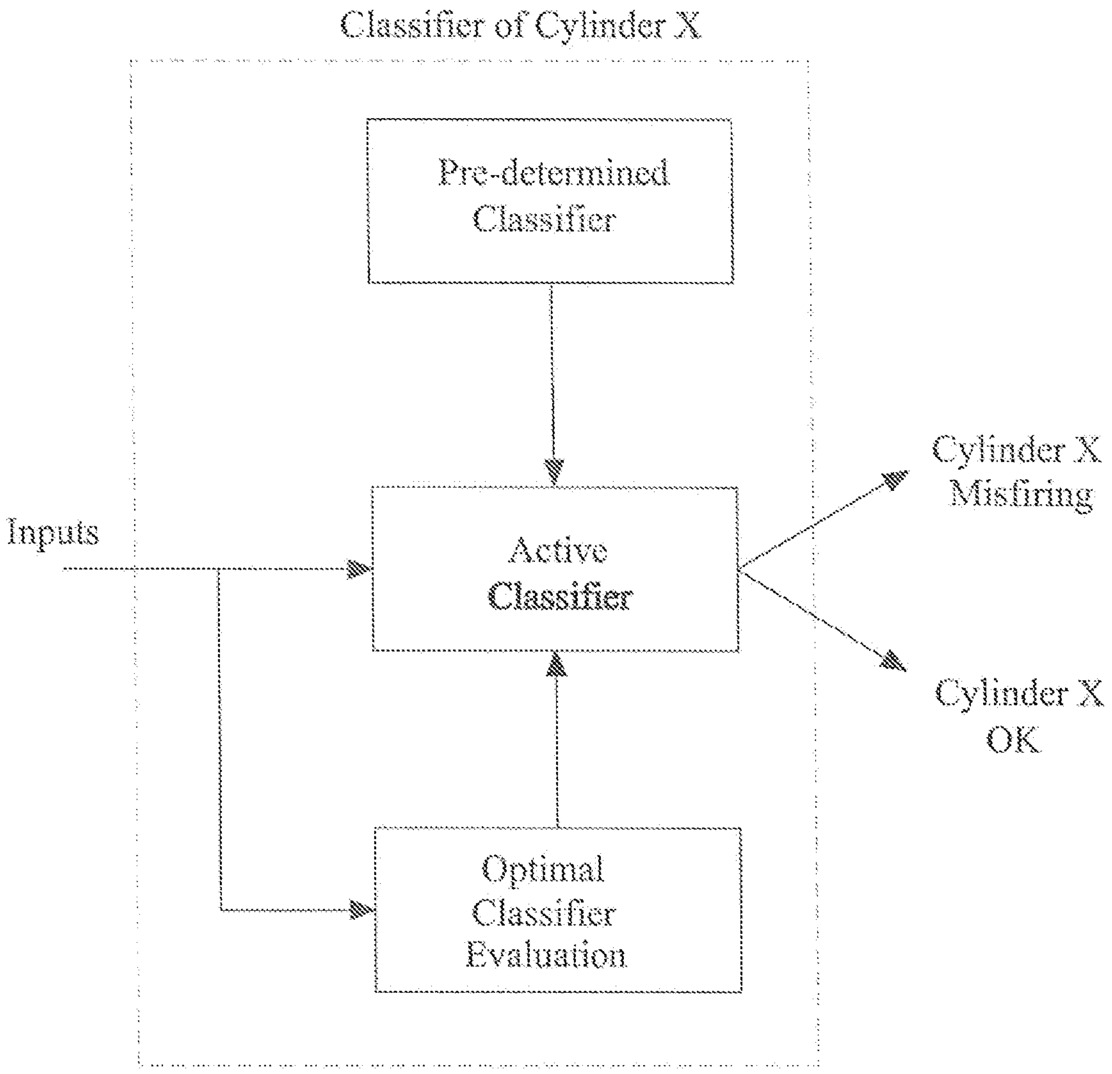
FIG. 1 is a schematic diagram that illustrates a misfire detection logic for the method according to an embodiment.

On the basis of what described above, the logic of an embodiment of the invention, also depicted in FIG. 1, comprises three main steps training session: original classifier identification, real time classification between misfiring and not-misfiring cylinders, and evaluation of the drift of the system during engine life and identification of a new optimal classifier.

Describing first the training session, we note that a pre-determined classifier is built by means of a training dataset. In this dataset, the classifier identifies the optimal parameters for the misfire detection on each of the cylinders. In this way a set of pre-calibrated parameters are evaluated identifying the pre-determined Classifier. The number of classes, in the present case is two: misfiring cylinder and non-misfiring cylinder. For each cylinder, a separate classifier is trained, using faulty and not faulty samples. The classifier is thus trained to distinguish if a specific cylinder is misfiring or not.

Figure 2:
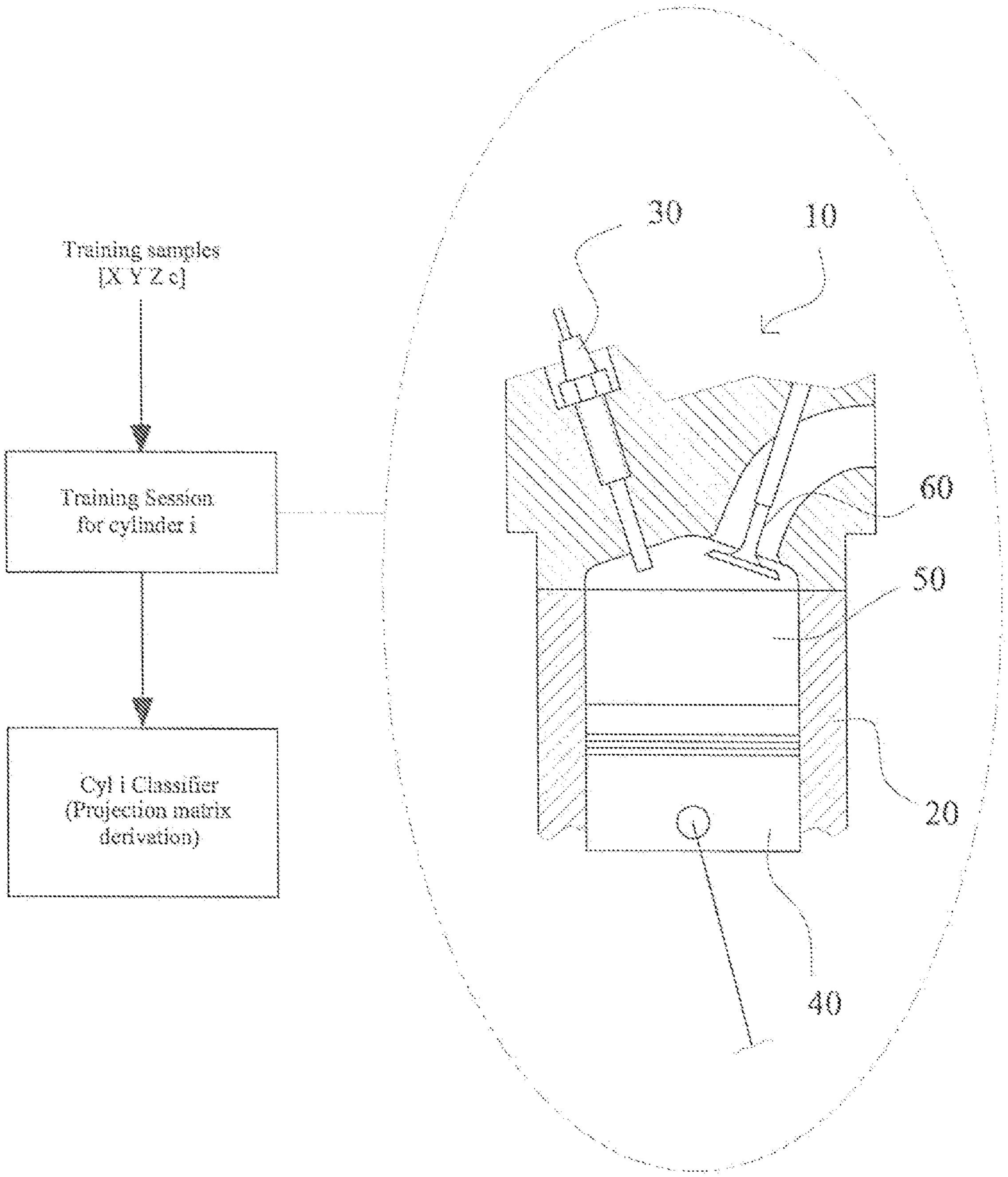
FIG. 2 is a diagram that illustrates a training session for a generic engine cylinder according to an embodiment of the method.

FIG. 2 illustrates schematically the training logic for each cylinder "i" in a multi-cylinder engine. Specifically, a cylinder 20 and piston 40 group belonging to an Internal Combustion Engine (ICE) 10 is depicted and in which a fuel injector 30 injects a quantity of fuel into a combustion chamber 50. As soon as the valve 60 closes, the fuel is ignited to start the combustion.

The input signals (X, Y, and Z in FIG. 2) are a subset of the signals measured and calculated in the ECU. The choice of the signals used as inputs is driven by a preliminary analysis on the whole signals set recorded by ECU. For example the signal chosen may be:

$X(t)=[X1(t), X2(t), \ldots Xn(t)]\rightarrow$input vector, where: $X1(t)$=RPM signal $X2(t)$=Crankshaft acceleration signal, and $Xn(t)$=Rail pressure signal.

A preferred choice is to use as inputs signals (or combinations of them) signals that, from common experience, are strictly related to the problem to be solved. As a guideline, the choice of the input signals may follow two rules: (i) samples that must be assigned to different classes (e.g.: misfire or no-misfire) must be well separated, and (ii) samples related to different misfiring cylinders must be well separated.

A further example of input signals suitable for the detection of a cylinder misfire are: X(t): Lores Period (period between two combustion events, Y(t): Crankwheel Speed Gradient, and Z(t): Difference between consecutive 90° period of crankwheel signal. With these signals, the samples remain well-separated in different clusters.

Concerning the real time classification, at the start of the engine life the classifier used is a pre-determined classifier. By means of a real-time logic, the new values of the same input signals used in the training session are considered by the classifier in order to distinguish between a misfiring and a non-misfiring cylinder. In order to classify the test samples the space must be divided into regions belonging to different classes. One possibility is to assign to the test sample the cluster with the smallest Mahalanobis distance. This, as other methods, permits to assign to each testing sample a class.

Figure 3:
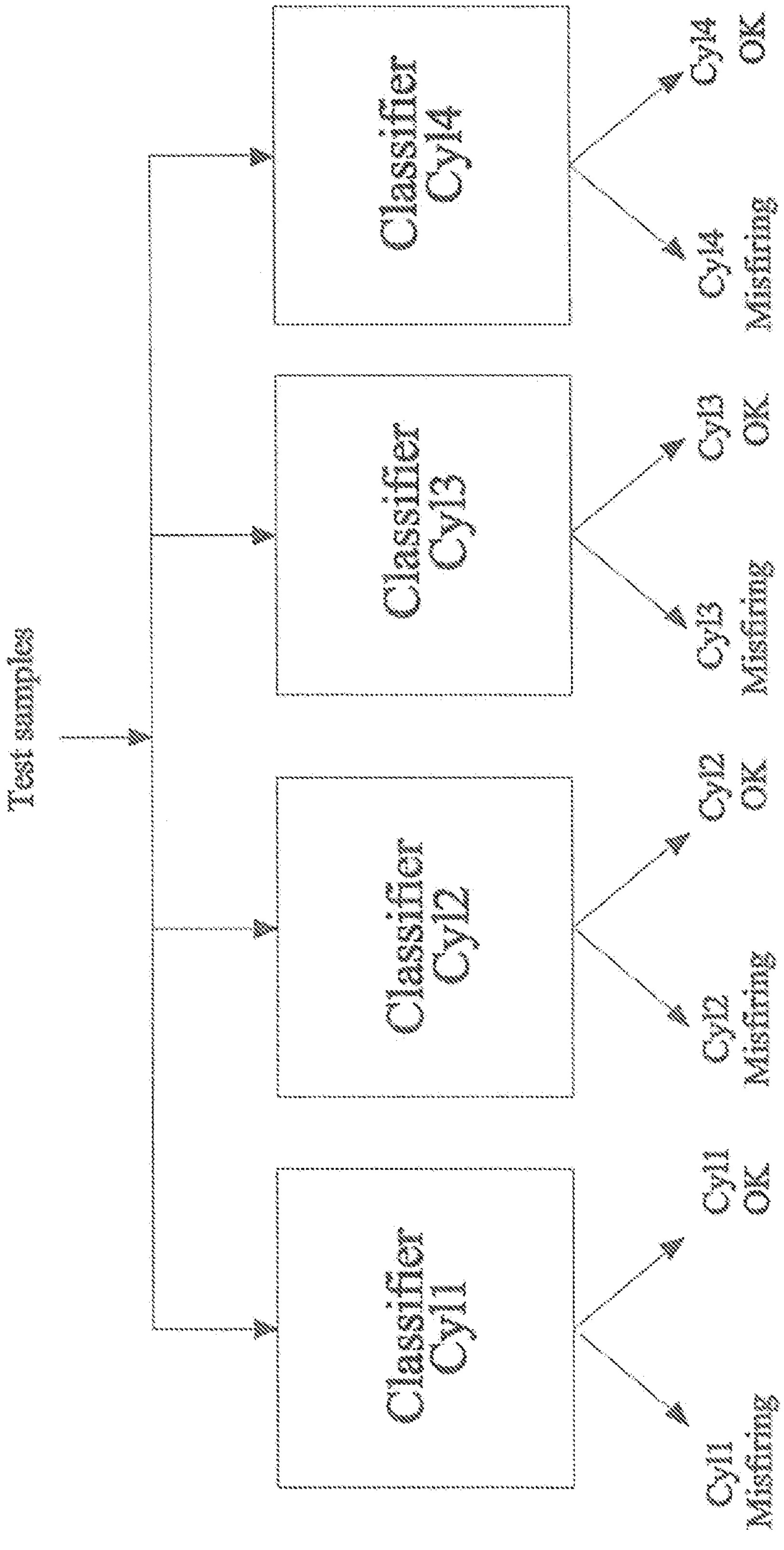
FIG. 3 is a diagram that illustrates a real time classification for an engine having multiple cylinders according to an embodiment of the method.

FIG. 3 illustrates the functioning of the four classifiers for a 4-cylinder engine. In parallel a method that performs an optimal classifier evaluation is executed during the whole engine life. This method continuously searches for an optimal classifier, comparing the new classifier to the actual classifier used. The aim of this optimal classifier evaluation logic is to estimate the drift of the no-faulty class during engine life. In this way the parameters of the classifiers can be adjusted in order to permit to the real-time methods to distinguish better between a faulty sample from a no-faulty sample. This operation can be performed in different ways.

Figure 4:
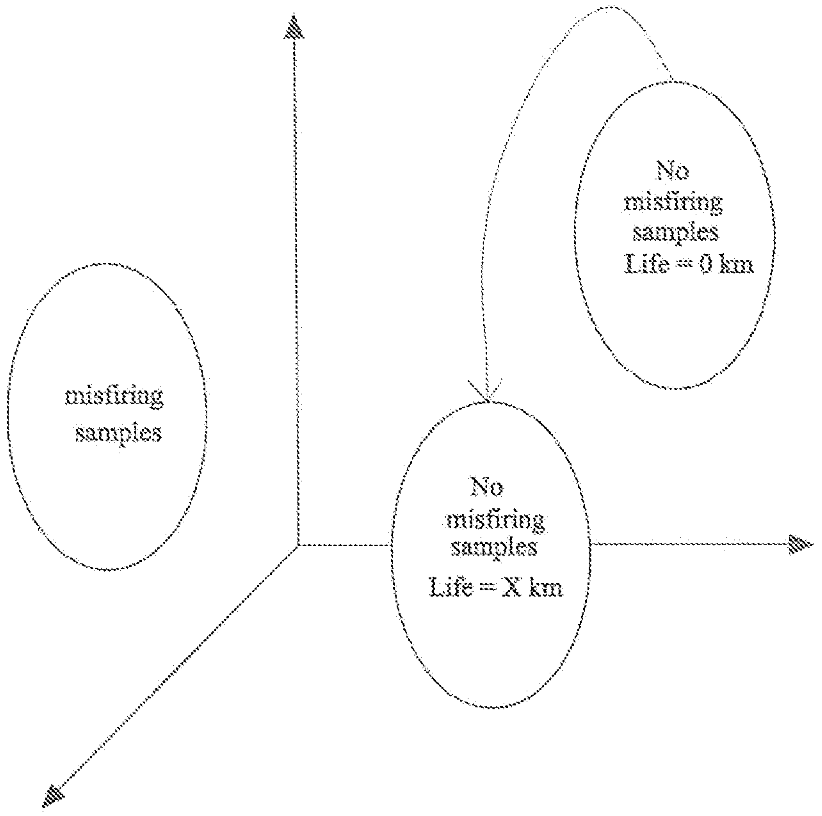
FIG. 4 exemplifies different groups of samples plotted in a configuration space, according to an embodiment of the method.

A possible way is to calculate a time variant multidimensional mean value of the samples in input for each cylinder, considering obviously only the sub-space of the input signals. A proper logic on this mean and also on the samples multidimensional variance can lead to consider the drift during the engine life in order to have a sort of auto-adaptive learning of the best classifier for each cylinder, as exemplified in FIG. 4. This approach constitutes an important improvement respect to more classical pattern recognition methods since this approach to misfire recognition using an auto-adaptive logic is able to consider the drifts during engine life. The two elliptical clouds depicting non misfiring samples in FIG. 5 above have the following meaning: (i) the position on the multidimensional space of the inputs of misfiring samples, during engine life, remains distant from the non-misfiring samples; (ii) during engine life the non-misfiring samples will drift on the multidimensional space of the inputs. Monitoring this drift allows to consider there related values in order to adjust the classifier parameters.

These classifiers are calculated by means of statistical methods, therefore if means and variances of the clouds of samples changes, also the classes definition should be modified. In other words, during engine life, the inputs recorded by the ECU will be used as new training datasets. For this purpose, for example, the flow chart of FIG. 5 may be considered.

Namely, a set of conditions is used to determine if the current classifier can still be used or, if due for example to components drifts over time, a new classifier must be substituted. In particular, for each cylinder the following means and variances of the signals pertaining to cylinder i are set for each ClassOk_i, namely the class related to non-misfiring samples of cylinder i.

A Mean_New(ClassOk_i) parameter is set that represents the new mean of the non-misfiring samples calculated on the "n" last recorded samples and a Mean_Original(ClassOk_i) parameter is also set that represents the original mean value of the non-misfiring samples calculated in the training phase. The absolute value difference between these values, namely |Mean_New(ClassOk_i)−Mean_Original(ClassOk_i)| is calculated and it is compared to a maximum and a minimum drift mean threshold according to the following equation 1:

$$\text{MinDriftMeanThreshold} < |\text{Mean\_New}(\text{ClassOk\_}i) - \text{Mean\_Original}(\text{ClassOk\_}i)| < \text{MaxDriftMeanThreshold}. \quad \text{(Eq. 1)}$$

At the same time, a Var_New(ClassOk_i) parameter is set that represents the new variance of the non-misfiring samples calculated on the "n" last recorded samples and a Variance_Original(ClassOk_i) parameter is also set that represents the original variance value of the non-misfiring samples calculated in the training phase. The absolute value difference between these values, namely |Var_New(ClassOk_i)−Var_Original(ClassOk_i)| is calculated and it is compared to a maximum and a minimum drift variance threshold according to the following equation 2:

$$\text{MinDriftVarThreshold} < |\text{Var\_New}(\text{ClassOk\_}i) - \text{Var\_Original}(\text{ClassOk\_}i) < |\text{MaxDriftVarThreshold} \quad \text{(Eq. 2)}$$

These conditions have the meaning that, if the absolute value difference between the means or the variances is respectively lower than a minimum drift mean MinDriftMeanThreshold or a minimum drift variance threshold MinDriftVarThreshold, the actual classifier is still valid and can still be used. Also, if the absolute value difference between the means or between the variances is respectively higher than a maximum drift mean MaxDriftMeanThreshold or than a maximum drift variance threshold MaxDriftVarThreshold, a misfire is being detected and the actual classifier is still considered valid.

Figure 5:
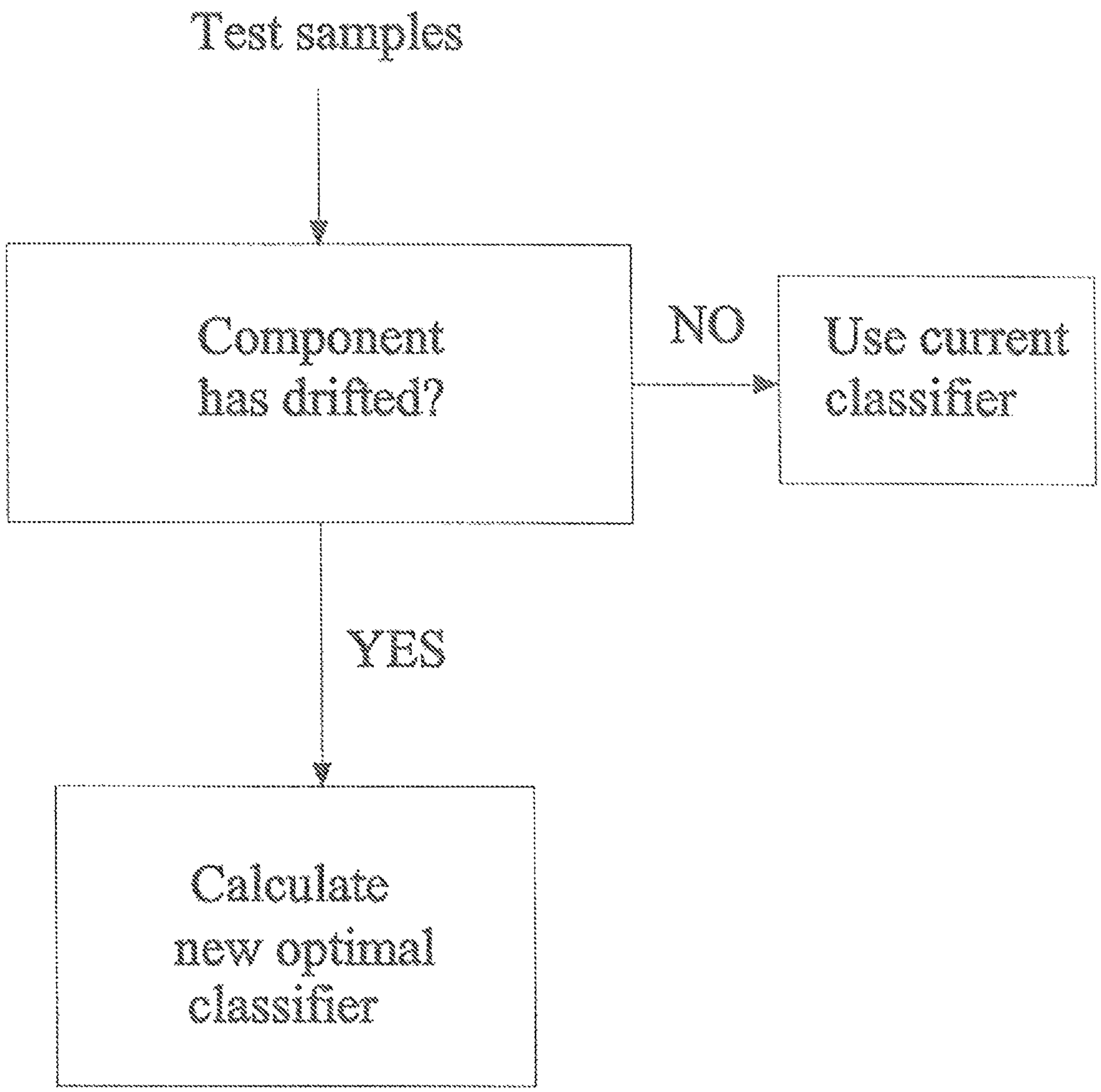
FIG. 5 illustrates a series of steps according to an embodiment of the method.

The combination of these equations therefore define a validity condition for said active classifier. On the contrary, this validity condition is not satisfied, when equations 1 and 2 are evaluated simultaneously and at least one of the conditions on the mean or on the variance is not satisfied. In this case, a new optimal classifier is calculated as schematically illustrated in FIG. 5.

Moreover, it is to be noted that the conditions of equations 1 and 2 express the idea that a classifier that is not anymore valid due to components drift can be detected by the fact that the absolute value difference between the means or between the variances of the signals is greater than a minimum threshold and thus is not negligible and it is smaller than a maximum threshold and thus it is not relative to a non-misfiring cylinder.

Experiments performed on real four-cylinder common rail compression ignition engines, in which some misfire events have been introduced, have shown that corresponding datasets have been obtained that can be divided into two sets. The no-misfire samples are grouped together in all cases for all cylinders: this means the possibility to define a no-faulty condition for the pattern recognition method.

In case of misfire on one cylinder, the signals considered react in a different way depending on the cylinder in the compression stroke: this gives the possibility to the pattern recognition method to distinguish well the effect of a misfire of one cylinder on the misfiring cylinder and on the others; If the misfiring cylinder is changed also the reciprocal disposition of the samples related to the different cylinders changes: this assures that the classifier distinguishes well the misfiring cylinder from the others.

The above considerations ensure that the method is robust and applicable in a wide variety of engine and engine conditions. Furthermore, as an example, the mean and variance for each cylinder are calculated considering the behavior of the relative cylinder during an interval of time of some seconds. In any case the sampling frequency may be adapted to the specific component monitoring with the proviso that the current state of electronic technology allows high sampling frequencies. Also, it must be considered that the method as being exemplified with reference to cylinder misfire problems, but it can be readily applied to the detection of malfunction of other components of the engine.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for detection of a component malfunction along a life of an internal combustion engine, said internal combustion engine comprising a cylinder and controlled by an Electronic Control Unit (ECU), the method comprising:

defining, by the ECU, a pre-determined component malfunction classifier at the start of engine life;

setting, by the ECU, said pre-determined component malfunction classifier as an active classifier, defining, by the ECU, a validity condition for said active classifier, acquiring, by the ECU, in real time a set of relevant signals relating to the operation of a component during the life of said internal combustion engine, feeding, by the ECU, said signals to said active classifier in order to determine the occurrence or not of a malfunction of said component and in case the validity condition of an actual classifier is not satisfied;

defining, by the ECU, a new classifier using the most recent relevant signals recorded by said ECU; and substituting, by the ECU, the actual classifier with said new classifier, wherein a search for a new classifier is performed continuously by the ECU during the life of said internal combustion engine and said validity condition is satisfied if an absolute value of a difference between an original mean of the signals pertaining to a regular functioning of said component and a mean of the signals calculated using the most recent relevant signals pertaining to a regular functioning of said component is outside a range set by a minimum drift threshold and a higher than a maximum drift threshold.

2. The method according to claim 1, wherein said pre-determined component malfunction classifier is defined with a training session in order to train said pre-determined component malfunction classifier to distinguish an occurrence of the malfunction of said component, said training session comprising an input into said pre-determined component malfunction classifier of a plurality of signals subdivided in signals pertaining to the malfunction of said component and signals pertaining to a regular functioning of said component.

3. The method according to claim 1, wherein the validity condition of said active classifier is evaluated as a function of the mean value and of a variance value of the plurality of input signals pertaining to said component.

4. The method according to claim 3, wherein said validity condition is satisfied if an absolute value of a difference between the original variance of the signals pertaining to a regular functioning of said component and the variance of the signals calculated using the most recent relevant signals pertaining to a regular functioning of said component is lower than a minimum drift threshold or higher than a maximum drift threshold.

5. The method according to claim 1, wherein said malfunction is a misfire.

6. A computer readable medium embodying a computer program product, said computer program product comprising:

a detection program for detection of a component malfunction along a life of an internal combustion engine, said internal combustion engine comprising a cylinder and controlled by an Electronic Control Unit (ECU), the detection program configured to:

define a pre-determined component malfunction classifier at the start of engine life;

setting said pre-determined component malfunction classifier as active classifier, define a validity condition for said active classifier, acquire in real time a set of relevant signals relating to the operation of a component during the life of said internal combustion engine, feed said signals to said active classifier in order to determine the occurrence or not of a malfunction of said component and in case the validity condition of an actual classifier is not satisfied;

define a new classifier using the most recent relevant signals recorded by said ECU; and substitute the actual classifier with said new classifier, wherein a search for a new classifier is performed continuously by the ECU during the life of said internal combustion engine and said validity condition is satisfied if an absolute value of a difference between the original variance of the signals pertaining to a regular functioning of said component and the variance of the signals calculated using the most recent relevant signals pertaining to a regular functioning of said component is lower than a minimum drift threshold or higher than a maximum drift threshold.

7. The computer readable medium embodying the computer program product according to claim 6, wherein said pre-determined classifier is defined with a training session in order to train said pre-determined component malfunction classifier to distinguish an occurrence of the malfunction of said component, said training session comprising an input into said pre-determined component malfunction classifier of a plurality of signals subdivided in signals pertaining to the malfunction of said component and signals pertaining to a regular functioning of said component.

8. The computer readable medium embodying the computer program product according to claim 6, wherein the validity condition of said active classifier is evaluated as a function of a mean value and of the variance value of the plurality of input signals pertaining to said component.

9. The computer readable medium embodying the computer program product according to claim 8, wherein said validity condition is satisfied if an absolute value of a difference between the original mean of the signals pertaining to a regular functioning of said component and the mean of the signals calculated using the most recent relevant signals pertaining to a regular functioning of said component is outside a range set by a minimum drift threshold and a higher than a maximum drift threshold.

10. The computer readable medium embodying the computer program product according to claim 6, wherein said malfunction is a misfire.

* * * * *